United States Patent
Shimanuki et al.

(10) Patent No.: US 6,740,432 B1
(45) Date of Patent: May 25, 2004

(54) FUEL CELL SYSTEM AND METHOD FOR REGULATING LIQUID FUEL FOR THE SAME

(75) Inventors: Hiroshi Shimanuki, Utsunomiya (JP); Toshikatsu Katagiri, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 52 days.

(21) Appl. No.: 09/592,721

(22) Filed: Jun. 13, 2000

(30) Foreign Application Priority Data

Jun. 22, 1999 (JP) .......................... 11-175987

(51) Int. Cl.[7] .......................... H01M 5/00; H01M 8/04; H01M 2/00; H01M 2/02; H01M 2/14

(52) U.S. Cl. .......................... 429/13; 429/17; 429/34; 429/39

(58) Field of Search .............................. 429/13, 17, 34, 429/38, 39

(56) References Cited

U.S. PATENT DOCUMENTS

| | | | | |
|---|---|---|---|---|
| 4,629,664 A | * | 12/1986 | Tsukui et al. | 429/23 |
| 5,773,162 A | * | 6/1998 | Surampudi et al. | 429/39 |
| 6,015,634 A | * | 1/2000 | Bonville, Jr. et al. | 429/17 |

FOREIGN PATENT DOCUMENTS

| | | | |
|---|---|---|---|
| JP | 08091804 A | | 9/1996 |
| JP | 8091804 | * | 9/1996 |

* cited by examiner

*Primary Examiner*—Patrick Ryan
*Assistant Examiner*—Julian Mercado
(74) *Attorney, Agent, or Firm*—Lahive & Cockfield, LLP; Anthony A. Laurentano

(57) ABSTRACT

Disclosed is a system comprising a mixing tank, a methanol supply unit, and a water supply unit. When it is detected by first and second level sensors that the mixture liquid stored in the mixing tank and the liquid fuel stored in the methanol supply unit are in not more than predetermined amounts respectively, water supply is stopped from the water supply unit to the mixing tank in accordance with the action of a changeover valve. Accordingly, it is possible to always maintain a constant mixing ratio of liquid fuel and water in the mixing tank, and it is possible to simplify the system.

6 Claims, 4 Drawing Sheets

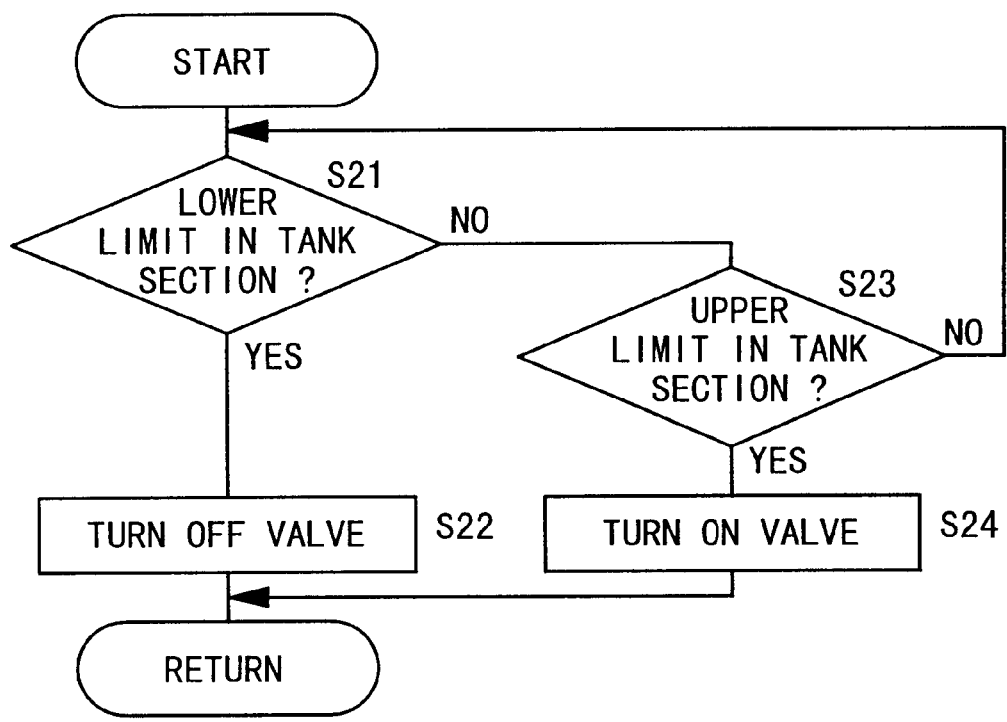

FUEL CELL SYSTEM AND METHOD FOR REGULATING LIQUID FUEL FOR THE SAME

BACKGROUND OF THE INVENTION

1. Field of the Invention

The present invention relates to a fuel cell system for supplying hydrogen gas produced from a mixture liquid composed of liquid fuel and water to an anode electrode which constitutes a fuel cell, and a method for regulating the liquid fuel for the same.

2. Description of the Related Art

The fuel cell stack, which is constructed, for example, by stacking a plurality of fuel cells each comprising an anode electrode and a cathode electrode disposed opposingly with a solid polymer ion exchange membrane interposed therebetween, the fuel cell being interposed between separators, has been developed, and it is being practically used for a variety of applications.

Such a fuel cell stack is designed as follows. That is, for example, a reformed gas (fuel gas), which contains a hydrogen-containing gas produced by reforming a mixture liquid (aqueous methanol solution) composed of water and liquid fuel such as methanol, is supplied to the anode electrode. An oxygen-containing gas (air or gas containing oxygen) is supplied to the cathode electrode. Thus, the hydrogen gas is ionized, while it flows through the solid polymer ion exchange membrane. Accordingly, electric energy is obtained at the outside of the fuel cell.

Various fuel cell systems has been suggested, which have such a structure that a predetermined amount of liquid fuel is mixed with a predetermined amount of water, and an obtained mixture liquid is supplied to a reformer. For example, a reforming raw material liquid supply apparatus is known, as disclosed in Japanese Laid-Open Patent Publication No. 8-91804. In this conventional technique, a reforming raw material liquid storage tank for storing a mixture liquid of methanol and water is arranged under a methanol-storing tank for storing methanol. The reforming raw material liquid storage tank is provided with a measuring means such as a specific gravity sensor, a concentration sensor, and a density sensor for measuring the mixing ratio of methanol and water. The opening degree of an automatic valve provided at a lower portion of the methanol storage tank is regulated depending on the mixing ratio of the reforming raw material liquid measured by the measuring means. Accordingly, the mixing ratio of methanol and water is adjusted to have a predetermined value in the reforming raw material liquid storage tank.

However, in the case of the conventional technique described above, the water, which is discharged from the fuel cell, is introduced into the reforming raw material liquid storage tank from a recovered water passage via a water separator. For this reason, the amount of water in the reforming raw material liquid storage tank is considerably increased, when the fuel cell is continuously operated. Therefore, in order to maintain a constant mixing ratio of the reforming raw material liquid, it is necessary to supply a large amount of methanol from the methanol storage tank to the reforming raw material liquid storage tank. As a result, the following problems are pointed out. That is, the amount of consumption of methanol is increased, and a considerably large size is required for the reforming raw material liquid storage tank itself for storing the reforming raw material liquid.

SUMMARY OF THE INVENTION

A principal object of the present invention is to provide a fuel cell system which makes it possible to highly accurately maintain the mixing ratio of liquid fuel and water, and realize a small size and simplification of the system with ease.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 shows a flow chart illustrating another procedure for processing recovered water in the water supply unit.

DESCRIPTION OF THE PREFERRED EMBODIMENTS

Figure 1:
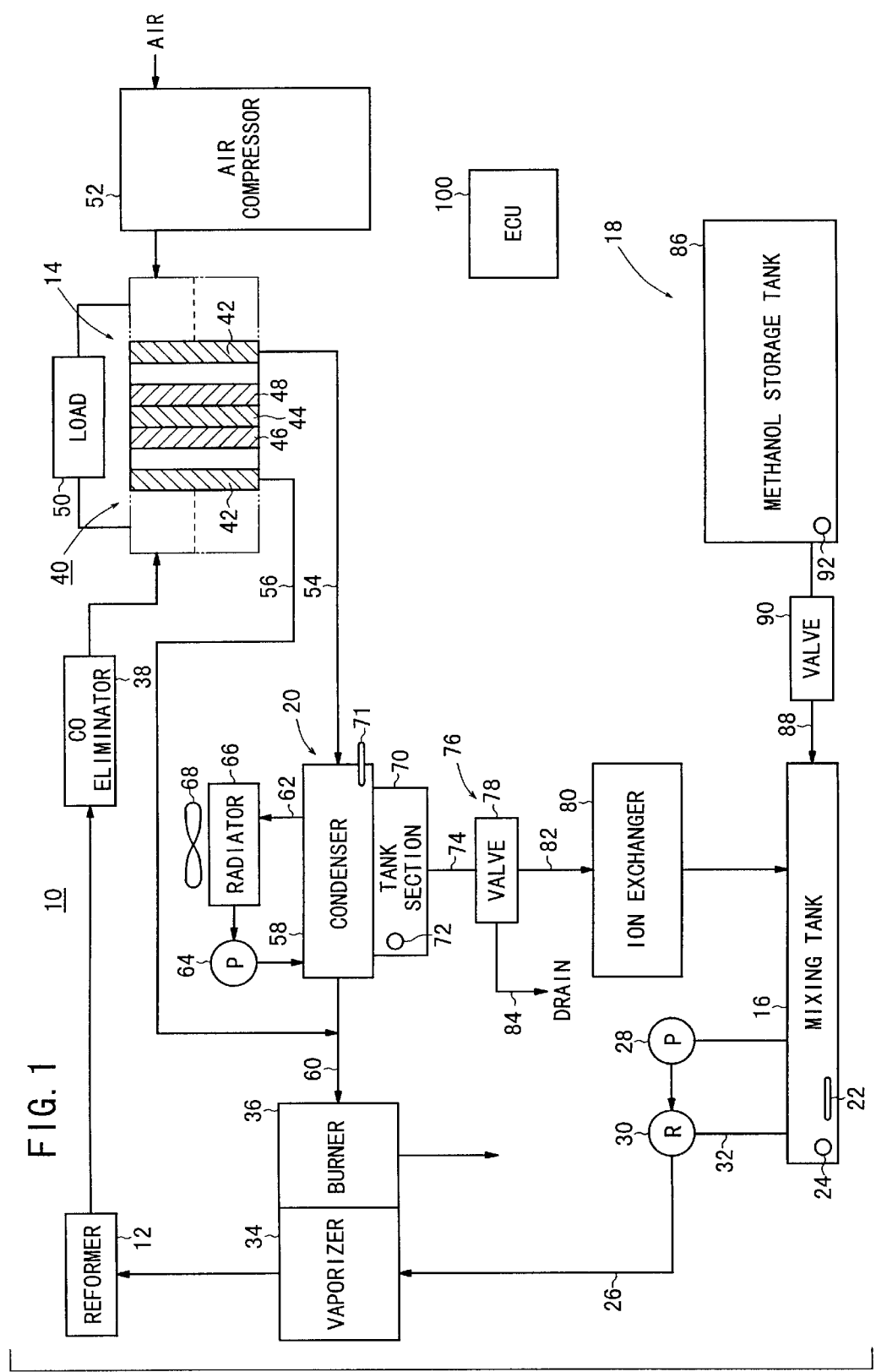
FIG. 1 shows a schematic arrangement of a fuel cell system according to an embodiment of the present invention.

FIG. 1 shows a schematic arrangement of a fuel cell system 10 according to an embodiment of the present invention.

The fuel cell system 10 comprises a fuel reformer 12 for producing reformed gas containing hydrogen gas, for example, from a mixture liquid of methanol ($CH_3OH$) and water, a fuel cell 14 to which the reformed gas as the fuel gas is supplied from the reformer 12, a mixing tank 16 for storing the mixture liquid of methanol and water and supplying the mixture liquid to the reformer 12, a methanol supply unit (liquid fuel supply unit) 18 for supplying methanol to the mixing tank 16, and a water supply unit 20 for supplying water to the mixing tank 16.

A methanol concentration sensor 22 for detecting the methanol concentration, and a first level sensor (first detecting means) 24 for detecting the level of the mixture liquid are arranged in the mixing tank 16. The mixing tank 16 is provided with a fuel passage 26. A first pump 28 and a first regulator 30 are arranged at intermediate positions of the fuel passage 26. A return passage 32 for returning the mixture liquid to the mixing tank 16 is connected to the first regulator 30.

The fuel passage 26 is connected to a vaporizer 34. The combustion heat is supplied to the vaporizer 34 from a burner 36. A fuel cell stack 40 is connected to the outlet side of the vaporizer 34 via a reformer 12 and a CO (carbon monoxide) eliminator 38.

The fuel cell stack 40 comprises a plurality of fuel cells 14 and a plurality of separators 42 which are alternately stacked. The fuel cell 14 includes a solid polymer ion exchange membrane 44, and a hydrogen-side electrode (anode electrode) 46 and an air-side electrode (cathode electrode) 48 which are provided opposingly with the solid polymer ion exchange membrane 44 interposed therebetween. The hydrogen-side electrode 46 and the air-side electrode 48 are connected to a load 50 such as an electric motor.

An air compressor 52, which is used to supply the atmospheric air (or gas containing oxygen) as the oxygen-containing gas to the air-side electrode 48, is connected to the fuel cell stack 40. Ends of first and second discharge passages 54, 56, which are used to discharge discharged components from the fuel cell stack 40, are connected to the fuel cell stack 40. A condenser (gas/liquid separator) 58, which constitutes the water supply unit 20 for separating the discharged components into gas components and water and supplying the water to the mixing tank 16, is connected to the first discharge passage 54. On the other hand, the second discharge passage 56 merges into a gas passage 60 which makes communication from the condenser 58 to the burner 36.

A piping tube 62 for a cooling medium is arranged for the condenser 58. The cooling medium such as cooling water circulates in the piping tube 62 by the aid of a second pump 64. A radiator 66 and a cooling fan 68 are arranged on the inlet side of the second pump 64. A tank section 70, which is used to temporarily store water, is provided on the lower side of the condenser 58. A third level sensor (third detecting means) 72 for detecting the level is arranged in the tank section 70. A changeover valve 78 for constructing a water supply stop means 76 is connected via a water passage 74 to a bottom portion of the tank section 70. The changeover valve 78 is composed of a so-called three-way valve which is capable of selectively making communication for the water passage 74 with a water passage 82 communicating with the mixing tank 16 via an ion exchanger 80 for removing ion components from water, and with a discharge passage 84 for discharging water to the outside.

The methanol supply unit 18 is provided with a methanol storage tank 86 which is designed to have a relatively large capacity. A methanol passage 88 is connected to the methanol storage tank 86. The methanol passage 88 is connected to the mixing tank 16 via an opening/closing valve 90. A second level sensor (second detecting means) 92 for detecting the amount of methanol stored in the methanol storage tank 86 is arranged in the methanol storage tank 86.

The fuel cell system 10 is provided with ECU 100 as a control circuit. The operation of the entire fuel cell system 10 is controlled by ECU 100.

The operation of the fuel cell system 10 constructed as described above will be explained below.

At first, when the operation is started, a predetermined amount of the mixture liquid of methanol and water, which is the liquid fuel stored in the mixing tank 16, is allowed to pass through the fuel passage 26, and it is supplied to the vaporizer 34 by the aid of the first regulator 30 in accordance with the action of the first pump 28. The mixture liquid, which is vaporized by the vaporizer 34 by the aid of the combustion heat supplied from the burner 36, is fed to the reformer 12, and it is reformed. Accordingly, the reformed gas (fuel gas) is obtained, which contains hydrogen gas and carbon dioxide gas. Carbon monoxide is removed from the reformed gas by the CO eliminator 38, and then the reformed gas is supplied to the respective hydrogen-side electrodes 46 of the fuel cell stack 40.

On the other hand, the atmospheric air (or gas containing oxygen) is supplied as the oxygen-containing gas from the air compressor 52 to the respective air-side electrodes 48 of the fuel cell stack 40. Therefore, the hydrogen gas contained in the reformed gas is ionized (converted into hydrogen ion) in the respective fuel cells 14, and the ion flows in the solid polymer ion exchange membrane 44 toward the air-side electrode 48. The hydrogen ion reacts with oxygen and electron on the air-side electrode 48 to form water. The electron serves as the electric energy to drive the load 50. On the other hand, the discharged components, which are discharged from the hydrogen-side electrode 46 and the air-side electrode 48, are introduced into the first and second discharge passages 54, 56.

The discharged components, which are introduced into the first discharge passage 54, are introduced into the condenser 58 to be separated into water and gas components. The gas components are fed to the burner 36 via the gas passage 60. The discharged components, which are introduced into the second discharge passage 56, merge into the gas passage 60, and they are fed to the burner 36.

Higher temperature in the condenser 58 than a preset temperature firstly activates the second pump 64 to circulate the cooling water in the piping tube 62. Higher temperature in the condenser 58 than a predetermined temperature activates the cooling fan 68 so that the cooling water flowing in the radiator 66 is forcibly cooled to circulate through the piping tube 62. Accordingly, the discharged components are separated into the water and the gas components in the condenser 58. The water having a predetermined temperature is produced in the tank section 70 of the condenser 58.

The water in the tank section 70 is fed from the water passage 74 via the changeover valve 78 to the water passage 82. The water passes through the ion exchanger 80, and it is supplied to the mixing tank 16. On the other hand, the methanol in the methanol storage tank 86 passes through the methanol passage 88 in accordance with the action to open the opening/closing valve 90, and it is supplied into the mixing tank 16. The mixing tank 16 is provided with the methanol concentration sensor 22. The changeover valve 78 and the opening/closing valve 90 are operated in accordance with the signal from the methanol concentration sensor 22. A predetermined amount of the mixture liquid of methanol and water is stored in the mixing tank 16.

Figure 2:
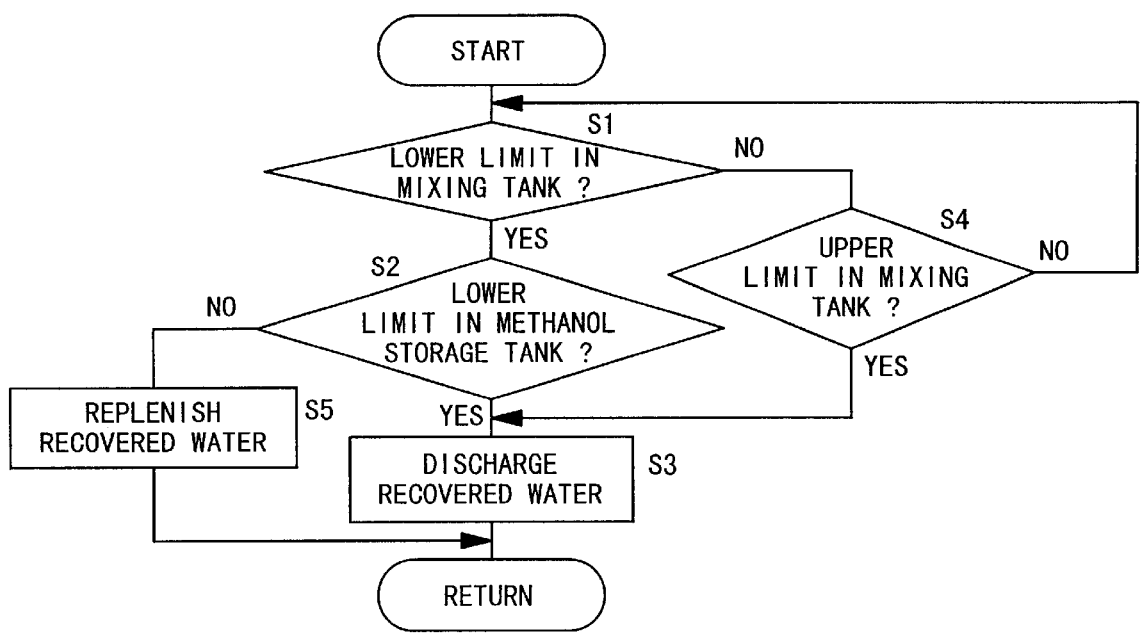
FIG. 2 shows a flow chart illustrating the process for maintaining a predetermined mixing ratio of methanol and water stored in a mixing tank.

Next, the procedure for maintaining a predetermined mixing ratio of methanol and water stored in the mixing tank 16 will be explained on the basis of a flow chart shown in FIG. 2.

At first, the level of the mixture liquid in the mixing tank 16 is detected by the aid of the first level sensor 24 to judge whether or not the level in the mixing tank 16 reaches a predetermined lower limit position (step S1). If it is detected that the mixture liquid in the mixing tank 16 is in not more than a predetermined amount (YES in step S1), the routine proceeds to the step S2 to detect the amount of methanol in the methanol storage tank 86. When the level of methanol in the methanol storage tank 86 reaches a lower limit position (YES in the step S2), then the changeover valve 78 is operated, and the water passage 74 communicates with the discharge passage 84. Water in the tank section 70 is discharged to the outside (step S3).

On the other hand, if it is judged in the step S1 that the amount of the mixture liquid in the mixing tank 16 is not less than the predetermined amount, the routine proceeds to the step S4 to judge whether or not the level in the mixing tank 16 reaches an upper limit position. When the level in the mixing tank 16 reaches the upper limit position (YES in the step S4), the routine proceeds to the step S3 so that the changeover valve 78 is driven to give the discharge position and the opening/closing valve 90 is closed to once stop the supply of methanol and water to the mixing tank 16.

If it is judged in the step S2 that the level in the methanol storage tank 86 is not less than the lower limit, the routine proceeds to the step S5. Accordingly, water in the tank section 70 is supplied to the mixing tank 16, and methanol in the methanol storage tank 86 is supplied to the mixing tank 16.

As described above, in the embodiment of the present invention, when the mixture liquid in the mixing tank 16 is in not more than the predetermined amount, and when the methanol in the methanol storage tank 86 is in not more than the predetermined amount, then the changeover valve 78, which constitutes the water supply stop means 76, is operated to discharge the water in the tank section 70 from the water passage via the discharge passage 84 to the outside.

Accordingly, when the methanol and the water are required to be replenished into the mixing tank 16 on the basis of the signal from the first level sensor 24, the water is not replenished from the water supply unit 20 to the mixing tank 16, even if a slight amount of methanol remains in the methanol storage tank 86. Thus, it is possible to obtain the following effect. That is, it is possible to always maintain a constant mixing ratio of methanol and water in the mixing tank 16. It is possible to reliably avoid the change of the mixing ratio by means of the simple system.

Further, the water supply stop means 76 is provided with, for example, the changeover valve 78 such as a three-way valve. Therefore, it is possible to reliably allot the water in the tank section 70 to the water passage 82 for making communication with the mixing tank 16 and to the discharge passage 84 for discharging the water to the outside. The arrangement of the water supply stop means 76 itself is effectively simplified.

Figure 3:
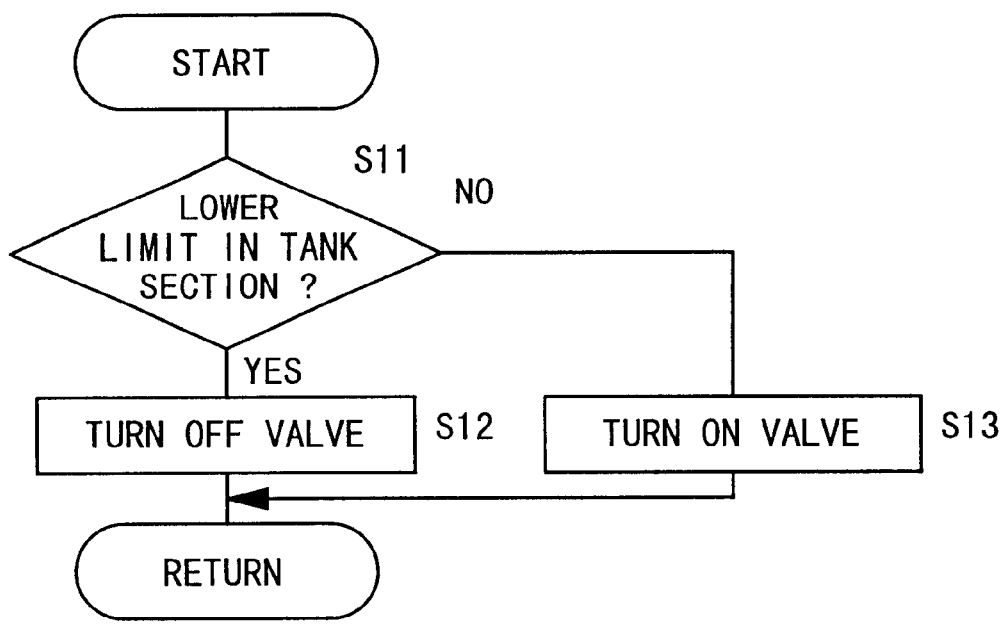
FIG. 3 shows a flow chart illustrating a procedure for processing recovered water in a water supply unit.

Next, the operation for processing recovered water in the water supply unit 20 will be explained on the basis of a flow chart shown in FIG. 3.

The third level sensor 72 is arranged in the tank section 70 which constitutes the water supply unit 20. The level in the tank section 70 is detected by the aid of the third level sensor 72. If the level in the tank section 70 reaches a lower limit position (YES in the step S11), the routine proceeds to the step S12 to close the changeover valve 78. Therefore, the produced water is allowed to remain in the tank section 70. The gas components, which are separated in the condenser 58, can be reliably prevented from being introduced into the side of the changeover valve 78.

On the other hand, if the level in the tank section 70 is not less than the lower limit position, the routine proceeds to the step S13 to open the changeover valve 78. Accordingly, the water passage 74 is allowed to make communication with the water passage 82 or the discharge passage 84. The water is replenished from the tank section 70 to the mixing tank 16, or the water is discharged.

Another operation for processing recovered water in the water supply unit 20 is shown in a flow chart in FIG. 4. That is, if the level in the tank section 70 reaches a lower limit position (YES in the step S21), the changeover valve 78 is closed (step S22). On the other hand, if the level in the tank section 70 reaches an upper limit position (YES in the step S23), the routine proceeds to the step S24 to open the changeover valve 78. Accordingly, it is possible to obtain such an advantage that the process for separating the gas components and the water in the condenser 58 is performed more reliably.

In the fuel cell system and the method for regulating the liquid fuel for the same according to the present invention, the supply of water from the water supply unit to the mixing tank is stopped, when it is detected that the liquid fuel, which is stored in the mixture liquid in the mixing tank and in the liquid fuel supply unit, is in not more than the predetermined amounts respectively. Therefore, it is possible to reliably avoid the change of the mixing ratio of the liquid fuel and the water in the mixing tank, while the change would be otherwise caused by excessive supply of water to the mixing tank. Accordingly, the mixing ratio of the mixture liquid in the mixing tank can be always maintained to be constant by using the simple system.

What is claimed is:

1. A fuel cell system provided with a fuel reformer for producing reformed gas containing hydrogen gas from a mixture liquid of liquid fuel and water, for supplying said reformed gas to an anode electrode of a fuel cell, said fuel cell including said anode electrode, a cathode electrode provided opposed to said anode electrode, and an electrolyte interposed therebetween, said fuel cell system comprising:

a mixing tank for mixing and storing said liquid fuel and said water and supplying said mixture liquid to said fuel reformer;

a liquid fuel supply unit for supplying said liquid fuel to said mixing tank;

a water supply unit for recovering water discharged from at least said fuel cell and supplying said water to said mixing tank;

a first detecting means for detecting an amount of said mixture liquid in said mixing tank;

a second detecting means for detecting an amount of said liquid fuel stored in said liquid fuel supply unit; and a water supply stop means for stopping supply of said water from said water supply unit to said mixing tank based on amounts of said mixture liquid and said liquid fuel detected by said first and second detecting means for maintaining a constant mixing ratio of said liquid fuel and said water in said mixing tank.

2. The fuel cell system according to claim 1, wherein:

said water supply unit includes a condenser for recovering water discharged from at least said fuel cell; and said water supply stop means includes a changeover valve connected to a water supply piping tube extending from said condenser to said mixing tank.

3. The fuel cell system according to claim 2, further comprising a third detecting means for detecting an amount of said water recovered in said condenser.

4. A method for regulating liquid fuel for a fuel cell system provided with a fuel reformer for producing reformed gas containing hydrogen gas from a mixture liquid of liquid fuel and water, for supplying said reformed gas to an anode electrode of a fuel cell, said fuel cell including said anode electrode, a cathode electrode provided opposed to the anode electrode, and an electrolyte interposed therebetween, said method comprising the steps of:

detecting an amount of said mixture liquid stored in a mixing tank for supplying said mixture liquid to said fuel reformer;

detecting an amount of said liquid fuel stored in a liquid fuel supply unit for supplying said liquid fuel to said mixing tank; and stopping supply of water to said mixing tank from a water supply unit for recovering water discharged from at least said fuel cell and supplying said water to said mixing tank based on said detected amounts of said mixture liquid and said liquid fuel for maintaining a constant mixing ratio of said liquid fuel and said water in said mixing tank.

5. The method for regulating said liquid fuel according to claim 4, further comprising the steps of:

detecting an amount of said water in a tank section which constitutes said water supply unit;

storing said water in said tank section by stopping said supply of said water to said mixing tank when it is detected that said water in said tank section is not more than a predetermined amount; and supplying said water to said mixing tank when it is detected that said water in said tank section is in not less than said predetermined amount.

6. The method for regulating said liquid fuel according to claim 4, further comprising the steps of:

detecting an amount of said water in a tank section which constitutes said water supply unit;

storing said water in said tank section by stopping said supply of said water to said mixing tank when it is detected that said water in said tank section is in not more than a predetermined lower limit amount; and supplying said water to said mixing tank when it is detected that said water in said tank section is in not less than a predetermined upper limit amount.

* * * * *